United States Patent
Söllner

(10) Patent No.: US 7,194,324 B2
(45) Date of Patent: Mar. 20, 2007

(54) METHOD AND CONFIGURATOR FOR CREATING A PLANT CONCEPT FROM A NUMBER OF PLANT COMPONENTS

(75) Inventor: Siegfried Söllner, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 641 days.

(21) Appl. No.: 10/621,578

(22) Filed: Jul. 18, 2003

(65) Prior Publication Data

US 2004/0019397 A1 Jan. 29, 2004

(30) Foreign Application Priority Data

Jul. 18, 2002 (DE) ................ 102 32 659

(51) Int. Cl.
*G06F 19/00* (2006.01)

(52) U.S. Cl. ........................... 700/97; 706/919

(58) Field of Classification Search ............ 700/97; 703/1; 706/26, 27, 919, 921
See application file for complete search history.

(56) References Cited

U.S. PATENT DOCUMENTS

| 5,630,025 | A | 5/1997 | Dolby et al. | |
|---|---|---|---|---|
| 6,002,854 | A | 12/1999 | Lynch et al. | |
| 7,003,359 | B2 * | 2/2006 | Phelps et al. | 700/97 |
| 7,003,548 | B1 * | 2/2006 | Barck et al. | 705/27 |
| 2003/0055742 | A1 * | 3/2003 | Hodl | 705/26 |
| 2006/0100829 | A1 * | 5/2006 | Lynch et al. | 703/1 |

FOREIGN PATENT DOCUMENTS

| DE | 3911465 | | 10/1990 |
|---|---|---|---|
| DE | 19918810 | | 11/2000 |
| EP | 1048993 | | 11/2000 |
| EP | 1 178 377 | A1 | 2/2002 |
| EP | 1178377 | A1 * | 2/2002 |

OTHER PUBLICATIONS

Männistö, Tomi, et al., "View to Product Configuration Knowledge Modelling and Evolution", XP002277984, pp. 1-8.

* cited by examiner

*Primary Examiner*—Leo Picard
*Assistant Examiner*—Steven R. Garland
(74) *Attorney, Agent, or Firm*—Harness, Dickey & Pierce, P.L.C.

(57) ABSTRACT

An electronic data processing (EDP)-based method and configurator are for creating a plant concept from a number of plant components. A desired specification of a technical plant is recorded using specification data. Then, from a stored supply of plant component types, those plant component types which are required for satisfying the desired specification of the technical plant are selected on the basis of the specification data using a classification device. The selected plant component types are linked up to form a plant configuration, using the classification device, in such a way that in principle the plant configuration at least substantially satisfies the desired specification of the technical plant. Finally, from the plant configuration, a plant concept is created using a selection device, the plant component types being replaced by plant components. The result is that the plant concept describes an actually feasible technical plant.

9 Claims, 1 Drawing Sheet

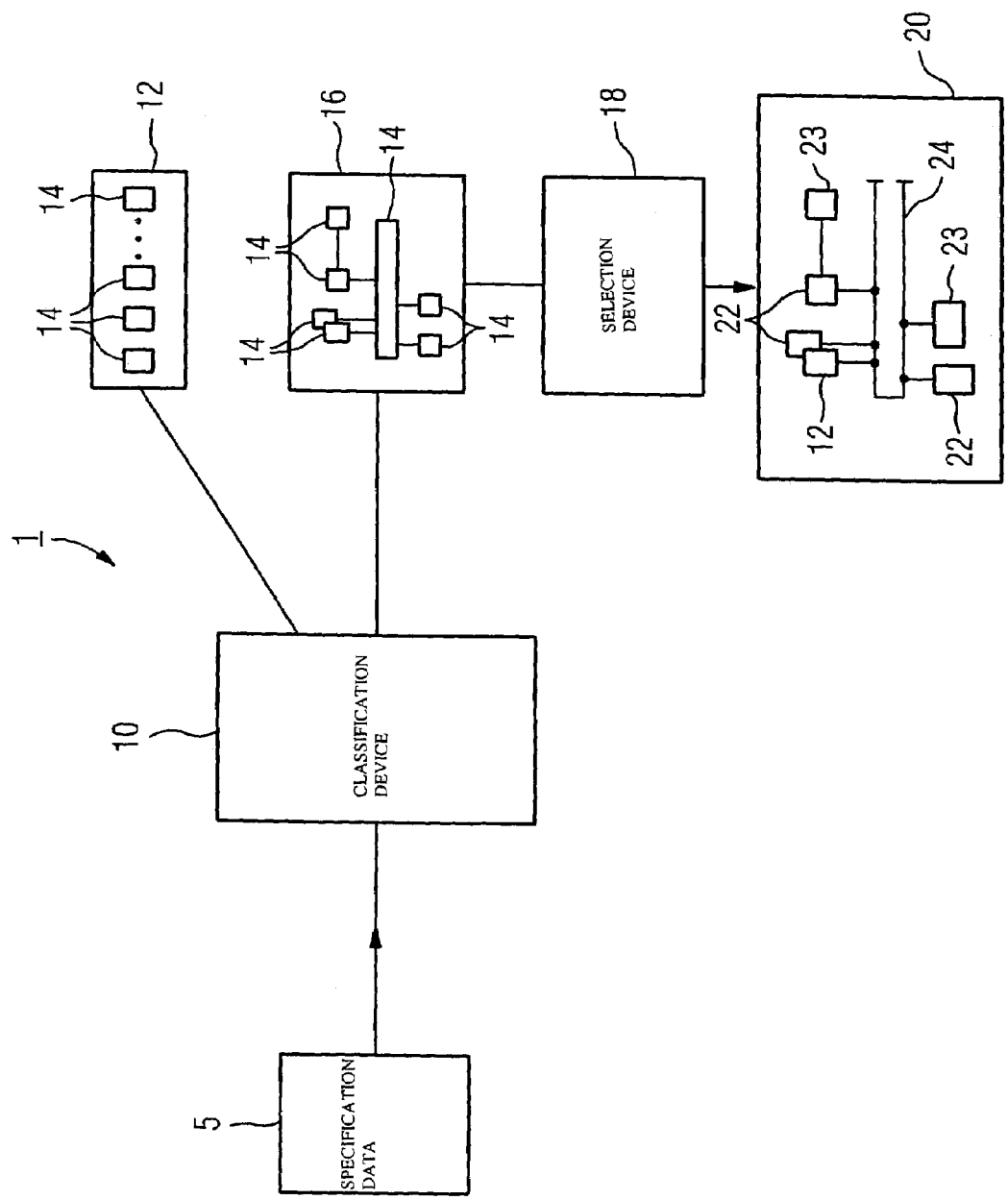

METHOD AND CONFIGURATOR FOR CREATING A PLANT CONCEPT FROM A NUMBER OF PLANT COMPONENTS

The present application hereby claims priority under 35 U.S.C. §119 on German patent application number DE 10232659.2 filed Jul. 18, 2002, the entire contents of which are hereby incorporated herein by reference.

FIELD OF THE INVENTION

The invention generally relates to a method and a configurator for creating a plant concept from a number of plant components, the plant concept serving for the actual realization of a technical plant.

BACKGROUND OF THE INVENTION

In the preparation of a tender for a technical plant and its detailed planning and design for later implementation, it has until now usually been necessary to work out a proposal for the plant configuration and a corresponding price offer purely manually on the basis of specification data of the technical plant, available for example as tender specifications, the proposed plant configuration being intended to satisfy in principle the requirements of the tender specifications as far as possible. The actual realization of the technical plant then includes the selection and ordering of actually obtainable plant components, which are interconnected in a way corresponding to the plant configuration worked out. Plant components are understood in this connection as meaning both hardware components, for example computers, printers, programmable controllers, etc., and software components, for example operating systems, user programs, databases, data acquisition programs, control programs, etc.

In order to reduce the amount of work, in particular when preparing a tender for a technical plant, it is currently often the practice to revert to tenders already drawn up earlier or plants already planned and designed in detail earlier. Then one would update, supplement and revise these data manually for a tender currently to be drawn up or detailed planning and design currently to be carried out.

The quality of the result is in this case only as good as that of the similar case prepared earlier. In particular, it is very difficult in this way to incorporate innovations which have taken place in the meantime with respect to the techniques used, pricing, etc., with the result that errors are virtually unavoidable.

Until now, the activities mentioned above in the preparation of tenders for a technical plant and its detailed planning and design have been carried out substantially manually in the implementation phase. They have therefore been time-consuming and susceptible to errors.

SUMMARY OF THE INVENTION

An embodiment of the invention is therefore based on an object of providing an improved method for creating a plant concept from a number of plant components and a corresponding configurator for carrying out the method.

With respect to the method, the object may be achieved according to an embodiment of the invention, by an electronic data processing (EDP)-based method for creating a plant concept from a number of plant components, with the following steps:

1. A desired specification of a technical plant is recorded by use of specification data.
2. From a stored supply of plant component types, those plant component types which are required for satisfying the desired specification of the technical plant are selected on the basis of the specification data by way of a classification device.
3. The selected plant component types are linked up to form a plant configuration by way of the classification device in such a way that in principle the plant configuration at least substantially satisfies the desired specification of the technical plant, and
4. from the plant configuration, a plant concept is created via a selection device, the plant component types being replaced by plant components, with the result that the plant concept describes an actually feasible technical plant.

The method according to an embodiment of the invention provides a universal method in which a basic configuration of the technical plant is automatically created from the specification data, recorded for example by use of an electronic form. In this case, the functions required to satisfy the required plant specification are initially provided "only" in principle, in that symbols representing plant component types, for example prefabricated, stored, actual plant components, are selected from a supply and subsequently linked up, for example graphically. The result is that the basic plant configuration produced in this way is suitable for satisfying the required plant specification. In this step, the plant component types are not plant components which can be actually obtained, for example can be identified by means of order data.

A plant component type may be, for example, a computer, it not having been established as yet which actual computer (that is to say, for example, with which processor, with which internal drives, with which interfaces, with which software etc.) is intended to execute the function envisaged for the plant component type later in the actual realization of the technical plant.

A further example of a plant component type is a control program, for example for controlling the power of a turbine for generating electrical energy. For example, the specification data indicates that such a control program is required; therefore, the component type "control program for turbine power control" is selected by way of the classification device and linked up with a, for example previously selected, component type "computer", on which the control program is to be executed. In this case, at the time of the selection of the plant component type "control program for turbine power control", it has not been established as yet which actual algorithm is being used for the control, in which programming language the control program is being written, under which operating system the control program will run, etc.

In a next step, finally, a technical actually feasible plant concept is then determined by way of the selection device, in that the plant component types—initially representing general functions—are replaced by plant components which are preferably actually obtainable and/or directly producible and/or directly identifiable by means of order data or procurement data. The plant components consequently include actual embodiments in connection with an embodiment of the invention of the corresponding general plant component types.

When replacing the plant component types with plant components, it may happen that a number of actual plant components come into consideration for a plant component type, the components respectively coming into consideration for the execution of the function envisaged for the plant component type. In such a case, it is possible for the selection device to replace the corresponding plant component type with all the plant components coming into consideration and to leave the ultimate selection of one of the suitable plant components from the group of plant components coming into consideration to a user of the method.

Alternatively, in the case of a number of plant components coming into consideration, the selection unit may automatically select from them a preferred plant component, for example a previously established standard plant component.

An embodiment of the method according to an embodiment of the invention may include the following steps:

An electronic form is used to input the specification data for a technical plant, for example for a control and instrumentation system:
  number of local control panels
  functions of the local control panels (for example manual operation, local visual display, synchronization, power supply, redundancy . . . )
  power output of the machines to be controlled
  number of inputs/outputs of the local control panels (under some circumstances this can be derived indirectly from the power output of the machines)
  type of communication (bus: single/redundant; radio; discrete wiring . . . ) with the central computers
  number of central computers, redundancy
  functions of the central computers
  other functions of the control and instrumentation system.
The classification device determines from the specification data, for example by the methods of pattern recognition and/or fuzzy logic and/or neural networks, a plant configuration of the desired technical plant, in that it selects plant component types from a stored supply, represents them graphically as symbols and links them up graphically to form a technical plant which is, in principle, operational.

The selection unit replaces the plant component types with actual, actually obtainable and/or directly producible component types, which are stored for example together in a database, for example an electronic catalog; consequently, a tender with prices, an actually feasible plant configuration and the required software components are automatically provided, for example, in a simple way.

With respect to the configurator, an object may be achieved according to an embodiment of the invention by a configurator for creating a plant concept from a number of plant components, comprising the following configurator components:
means for electronically recording specification data of a technical plant, the specification data describing a desired specification of a technical plant,
a classification device, which can be used to select from a stored supply of plant component types those plant component types which are required for satisfying the desired specification of the technical plant on the basis of the specification data and, can be used to link up the selected plant component types to form a plant configuration in such a way that in principle the plant configuration at least substantially satisfies the desired specification of the technical plant, and
a selection device, which can be used to create from the plant configuration a plant concept, the plant component types being replaced by plant components, with the result that the plant concept describes an actually feasible technical plant.

The explanations, statements and benefits presented in connection with the method according to an embodiment of the invention can be transferred analogously to a configurator according to an embodiment of the invention and are therefore not repeated at this stage.

An exemplary embodiment of the invention is presented in more detail below.

BRIEF DESCRIPTION OF THE DRAWINGS

In the drawings:
the FIGURE shows a configurator according to an embodiment of the invention.

DETAILED DESCRIPTION OF THE PREFERRED EMBODIMENTS

The FIGURE shows a configurator 1 according to an embodiment of the invention, which includes as main component parts a classification device 10 and also a selection device 18.

By way of the configurator 1 according to an embodiment of the invention, it is intended that a plant concept 20 of the technical plant can be created from specification data 5. The specification data 5 include a desired specification of a technical plant, that is to say for example a desired functionality of plant parts. The plant concept 20 describes an actually feasible technical plant. The particular result is that, as far as possible, there is no longer any necessity for the information included in the plant concept 20 to be detailed or interpreted any further, in order, for example, to allow plant components 22, 23, 24 required for the realization of the technical plant to be identified and obtained or produced.

The specification data 5 are recorded, for example, using an electronic form. The specification data 5 may indicate that the technical plant is a control and instrumentation system for a steam power plant, for example. The steam power plant may include four steam turbines each with a power output of 200 MW. The specification data 5 may indicate that a local control panel is respectively to be provided for controlling the steam turbines, that each of these control panels is to include manual operation, a device for rapid start-up, an emergency shutdown and a visual display, etc. The specification data 5 may indicate that, for supplying the power plant components, a further control panel is to be provided for controlling the auxiliary power requirements and that a central computer system which is, for example, to be of a redundant design and have the possibility of coupling to further systems is to be provided. Apart from or instead of these specification data 5 mentioned by way of example, any other desired specification data relating to the desired specification of a technical plant are conceivable and are within the contents of embodiments of the present invention.

The specification data 5, which generally include a number of individual data, are processed by the classification device 10, to the extent that information included by the number of specification data 5 is used to conclude plant component types 14 stored in a supply 12 which are required for satisfying the desired specification of the technical plant, in order, for example, to be able to execute the functions of the technical plant comprised by the desired specification.

The plant component types 14 are, in particular, not finally specified plant components, for example which can be obtained by means of order data, such as a specific computer with specific equipment or a specific data transmission cable with specific properties. Rather, the plant component types 14 serve within a plant configuration 16 established by way of the classification device 10 to a certain extent as "functional wildcards" for plant components 22, 23, 24 to be specified in more detail in a next step. The result is that the desired specification of the technical plant recorded by use of the specification data 5 is satisfied in principle, without the plant configuration 16 already comprising actual plant components 22, 23, 24 for realizing the plant component types 14.

Along with the selection of the plant component types 14 from the supply 12, the classification device 10 also has the task of linking up the selected plant component types 14, for example in the form of a graphic representation. This is done in such a way that the plant configuration 16 produced from the selected plant component types 14 and their link-ups with one another is suitable in principle for satisfying the desired specification of the technical plant.

The classification device 10 may be realized, for example, by a neural network. This receives the specification data 5 as input data and supplies the plant component types and their link-ups as output data.

For this purpose, the neural network may be trained in advance with test data. The result is that, during the operation of the configurator, corresponding output data are interpolated from the specification data 5. To be able to derive from the plant configuration 16 a plant concept 20 which describes an actually feasible technical plant, the selection device 18 is provided.

A main task of the selection device 18 is to replace the selected plant component types 14 with plant components 22, 23, 24. The result is that the desired specification of the technical plant can not only be satisfied in principle by the plant concept 20, but is also actually feasible, involving for example ordering of the plant components 22, 23, 24 included in the plant concept 20 and connecting them up in a way corresponding to the connections between the plant components 22, 23, 24 likewise comprised by the plant concept 20.

The plant concept 20 may be, for example, a graphic representation on a computer screen or a printout thereof, on which the plant components 22, 23, 24 and their interconnections (connections) to be made can be seen in detail. This can be done in such a way that, for an actual implementation of the technical plant described by way of the plant concept 20 and satisfying the desired specification, no further detailed research is required to allow the technical plant to be realized.

It is also possible for the selection device 18 to replace one or more plant component types 14 with a selection of plant components 22, 23, 24, each plant component included by the selection being able to execute the desired function of the corresponding plant component type 14. This may be the case, for example, whenever a number of computers are suitable for satisfying a desired function of the specification of the technical plant, with the result that the ultimate selection of the actual plant components 22, 23, 24 is left for example to the user of the configurator 1.

Alternatively, in such a case a preferred type of a plant component 22, 23, 24 may be proposed or even automatically selected by means of the selection device.

The plant component types 14 and the plant components 22, 23, 24 may be both hardware components and software components. Consequently, a plant configuration 16 which includes as plant component types 14, a computer and a software program associated with this computer can be produced, for example, by use of the classification device 10 from the specification data 5.

The selection device 18 is then used to replace the plant component types 14 mentioned, that is to say the computer and the software program, with a specific computer with specific properties and a specific software program, for example an operating system or a user program. The selection device 18 may be realized for example by use of a neural network.

It is likewise conceivable for the information comprised by the plant concept 20 to be used in particular for the automatic loading of software programs in computers. This is true since both the computer actually used for realizing a technical plant and the software program actually used on this computer may be inlcuded in the plant concept 20. A result is that automatic loading of said software can easily be realized.

A configurator according to an embodiment of the invention may be used advantageously for preparing tenders for a technical plant. This is true in particular if the plant components 22, 23, 24 include information with respect to their respective tender price.

In such a case, after determination of the plant concept 20, not only an actually feasible technical plant is available, but also its tender price.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for creating a plant concept from a plurality of plant components, comprising:
   recording a desired specification of a technical plant using specification data;
   selecting plant component types required for satisfying the desired specification of the technical plant from a stored supply of plant component types using a first neural network, wherein the plant component types are selected based on the specification data;
   linking up the selected plant component types to form a plant configuration, wherein the linking up occurs in such a way that in principle, the plant configuration at least substantially satisfies the desired specification of the technical plant; and
   creating the plant concept from the plant configuration using a second neural network, wherein the plant component types are replaced by plant components, resulting in the plant concept describing an actually feasible technical plant; wherein
   the first and second neural networks are different.

2. The method of claim 1, wherein the plant component types are selected based on the specification data using a classification device.

3. The method of claim 2, wherein the selected plant component types are linked up to form a plant configuration using the classification device.

4. The method of claim 3, wherein a plant concept is created from the plant configuration using a selection device.

5. The method of claim 1, wherein the selected plant component types are linked up to form a plant configuration using a classification device.

6. The method of claim 1, wherein a plant concept is created from the plant configuration using a selection device.

7. A configurator for creating a plant concept from a plurality of plant components, comprising:

means for electronically recording specification data of a technical plant, the specification data describing a desired specification of a technical plant;

a classification device based on a first neural network, adapted to select, from a stored supply of plant component types, plant component types required for satisfying the desired specification of the technical plant based upon the specification data and adapted to link up the selected plant component types to form a plant configuration in such a way that in principle, the plant configuration at least substantially satisfies the desired specification of the technical plant; and a selection device based on a second neural network different from the first neural network, the selection device being adapted to create from the plant configuration, the plant concept, wherein the plant component types are replaced by plant components, resulting the plant concept describing an actually feasible technical plant.

8. A method for creating a plant concept from a plurality of plant components, comprising:

recording a desired specification of a technical plant using specification data;

selecting, from a stored supply of plant component types, plant component types required for satisfying the desired specification of the technical plant, wherein the plant component types are selected based on the specification data using a classification device, the classification device being based on a first neural network;

linking up the selected plant component types to form a plant configuration using the classification device, wherein the linking up occurs in such a way that in principle, the plant configuration at least substantially satisfies the desired specification of the technical plant; and creating the plant concept from the plant configuration using a selection device, the selection device being based on a second neural network, wherein the plant component types are replaced by plant components, resulting in the plant concept describing an actually feasible technical plant; wherein the second neural network is difference from the first neural network.

9. A configurator for creating a plant concept from a plurality of plant components, comprising:

means for electronically recording specification data of a technical plant, the specification data describing a desired specification of a technical plant;

means for selecting, from a stored supply of plant component types, plant component types required for satisfying the desired specification of the technical plant based upon the specification data, and for linking up the selected plant component types to form a plant configuration in such a way that in principle, the plant configuration at least substantially satisfies the desired specification of the technical plant; and means for creating, from the plant configuration, the plant concept, wherein the plant component types are replaced by plant components.

* * * * *